United States Patent [19]

Hall

[11] Patent Number: 5,698,247
[45] Date of Patent: Dec. 16, 1997

[54] PROCESS FOR THE PREPARATION OF AN ICE CONFECTION

[75] Inventor: Gordon Hall, Weinheim, Germany

[73] Assignee: Good Humor-Breyers Ice Cream, Division of Conopco, Inc., Green Bay, Wis.

[21] Appl. No.: 741,450

[22] Filed: Oct. 31, 1996

[30] Foreign Application Priority Data

Nov. 6, 1995 [EP] European Pat. Off. ........ 95307887

[51] Int. Cl.$^6$ ............................................. A23G 9/00
[52] U.S. Cl. ........................ 426/66; 62/1; 426/393; 426/524; 426/565
[58] Field of Search ..................... 426/66, 565, 569, 426/524, 393; 62/1, 69

[56] References Cited

U.S. PATENT DOCUMENTS

| | | | |
|---|---|---|---|
| 3,619,205 | 11/1968 | Levan et al. | 426/590 |
| 3,640,081 | 2/1972 | Hadden | 62/1 |
| 3,897,571 | 7/1975 | Homler et al. | 426/327 |
| 4,031,262 | 6/1977 | Nakayama et al. | 426/565 |
| 4,310,559 | 1/1982 | Mita et al. | 426/101 |
| 4,398,394 | 8/1983 | Kleiner et al. | 62/1 |
| 4,398,395 | 8/1983 | Hinman et al. | 62/1 |
| 4,808,428 | 2/1989 | Forsstrom et al. | 426/569 |
| 5,055,315 | 10/1991 | Bee | 62/1 |
| 5,341,648 | 8/1994 | Umemura et al. | 62/73 |
| 5,394,705 | 3/1995 | Torii et al. | 62/74 |

FOREIGN PATENT DOCUMENTS

| | | |
|---|---|---|
| 201 143 | 12/1986 | European Pat. Off. . |
| 395 145 | 10/1990 | European Pat. Off. . |
| 2 416 649 | 9/1979 | France . |

*Primary Examiner*—George Yeung
*Attorney, Agent, or Firm*—James J. Farrell

[57] ABSTRACT

A process for the manufacture of a frozen spoonable water-ice comprising the steps of:
(i) producing of ice flakes at a temperature of −10° C. or below, preferably −20° C. or below;
(ii) grinding the ice flakes produced in step (i) into approximately spherical ice granules at a temperature of −10° C. or below, preferably −20° C. or below;
(iii) mixing the ice granules produced in step (ii) with a flavoured ice slurry; and
(iv) packaging the mixture obtained in step (iii) and freezing for storage.

6 Claims, No Drawings

PROCESS FOR THE PREPARATION OF AN ICE CONFECTION

TECHNICAL FIELD OF THE INVENTION

The invention relates to a process for the production of a frozen spoonable water-ice product.

BACKGROUND TO THE INVENTION

A granita is an Italian course-textured still-frozen water ice, containing fruit puree and ice granules, which is prepared and eaten immediately. To date it has not been possible to make granita products industrially because on frozen storage the ice granules present in the product form clumps resulting in a hard product which is no longer spoonable.

We have now found that it is possible to solve the problem of the ice granules sticking together if the ice granules are manufactured to be approximately spherical in shape and if the temperature is maintained at −10° C. or below throughout their manufacturing process.

U.S. Pat. No. 4,031,262 (Nakayama) discloses a refreshing ice-cream product containing ice granules. The ice granules or chips may be circular or rectangular in shape and may be made by breaking ice blocks into pieces with a hammer or the like, by spraying water into a supercooled chamber, or by spraying supercooled water into a chamber at normal temperature. The ice granules are used at a temperature of about −30° C. and are 1–1000 mm$^3$ in size.

However, Nakayama does not address the problem of how to prevent the ice granules adhering to each other, and furthermore does not disclose the solution which forms the essence of the present invention, i.e. that it is essential that throughout the production process of the ice granules, the temperature must be below −10° C. Furthermore the ice granules should be approximately spherical in shape. Indeed the specific processes disclosed in Nakayama for the production of the ice granules (processes C, D & E) all cool the ice granules to −30° C. after their production. The temperature is not maintained below −10° C. throughout the production process.

DISCLOSURE OF THE INVENTION

Accordingly the invention provides a process for the manufacture of a frozen spoonable water-ice comprising the steps of:

(i) production of ice flakes at a temperature of −10° C. or below, preferably −20° C. or below;
(ii) grinding the ice flakes produced in step (i) into approximately spherical ice granules at a temperature of −10° C. or below, preferably −20° C. or below;
(iii) mixing the ice granules produced in step (ii) with a flavoured ice slurry; and
(iv) packaging the mixture obtained in step (iii) and freezing for storage.

Conventionally ice granules for products such as granita are manufactured by grinding ice flakes at a temperature of approximately −2° C. However we have found that it is essential that the ice flake and subsequent ice granule production is conducted at −10° C. or below, preferably −20° C. or below, in order that the ice granules are not provided with a "wet" surface which causes aggregation of the ice granules on frozen storage. In this way a spoonable, frozen water-ice product can be manufactured.

Preferably the ice granules have a diameter of from 1 to 7 mm, most preferably 2–4 mm.

The ice flakes are conveniently produced by the addition of water into a vertical drum freezer at 5° C. The water is then cooled to −20° to −25° C. and flakes, preferably having a thickness of from 2–3 mm, are scraped from the surface of the drum. These flakes are transported at −20° to −25° C. to a grinding machine. The grinding machine is also at a temperature of from −20° to −25° C. The flakes are then ground into ice granules.

The flavoured ice slurry may be obtained in a usual manner by feeding the unfrozen mixture into a scraped surface heat exchanger wherein it is cooled to a temperature of approximately −6° C.

Preferably the flavoured ice slurry contains a stabiliser for example xanthan gum, carboxymethyl cellulose, locust bean gum, guar gum, alginate, gelatin or mixtures thereof.

Optionally the water-ice product of the invention may contain $CO_2$-water clathrate-containing particles in addition to the flavoured ice slurry and ice granules described above.

$CO_2$-water clathrate is meant to comprise any $CO_2$—containing clathrate such as double clathrates and mixed clathrates. For a better description thereof, reference is made to D. W. Davidson; clathrate hydrates in water—a comprehensive treatise, vol 2, chapter 3, Ed Franks.

In practice it is to be preferred that the $CO_2$-water clathrate-containing particles are exposed to such $CO_2$ pressure and temperature conditions, that $CO_2$ will evolve from the particle surfaces until a protective ice layer is formed, which for practical purposes prevents further $CO_2$ evolution under atmospheric conditions at temperatures below the melting temperature of ice. Usually this protective ice layer is formed within 15 seconds and consequently the stabilisation treatment is to be carried out for more than 15 seconds.

A protective layer can also be formed around the $CO_2$-water clathrate-containing particles by exposing these particles to a water-containing environment under such conditions that a layer of solid water condenses on the surfaces of the particles. This environment preferably comprises water vapour, which is condensed on the surfaces of the particles to form a solid protective ice layer thereon.

Once formed the $CO_2$-water clathrate-containing particles are admixed with the ice flakes produced in step (i) described above and both the $CO_2$-water clathrate containing particles and the ice flakes are ground in step (ii).

Typically a frozen spoonable water-ice product of the present invention will comprise from 85 to 50% by weight flavoured ice slurry; from 15 to 50% by weight, preferably 25 to 30% by weight ice granules; and from 0 to 20% by weight, preferably approximately 5% by weight $CO_2$-water clathrate-containing particles.

EXAMPLES

Example 1

An ice mix containing:

|  | % by weight |
| --- | --- |
| Sugar | 21 |
| Dextrose | 6.5 |
| Locust Bean Gum | 0.2 |
| Lime juice concentrate | 4.8 |
| Colouring | 0.03 |
| Flavours | 0.1 |
| Water | to 100 | was cooled to −6° C. in a scraped—wall heat exchanger to form a fluid slush product.

75% by weight of this slush product was admixed with 25% by weight ice granules at −20° C. having an approximately spherical shape with a diameter of 2–3 mm. This produced a water-ice product having a temperature of approximately −8° to −10° C. This was packaged and frozen in a freezing tunnel at −35° to −40° C. before frozen storage.

The product was spoonable direct from the freezer, even after 6 months frozen storage.

Example 2

75% by weight of slush product from Example 1 was admixed with 20% by weight ice granules at −20° C. having an approximately spherical shape and a diameter of 3–4 mm and 5% $CO_2$-water clathrate-containing particles product as described below. The product was packaged and stored as in Example 1.

The $CO_2$-water clathrate-containing particles were produced as follows:

In a pressurized reactor, $CO_2$ was contacted with water at a pressure of 35 bar and a temperature of 5° C. Thereafter the temperature was reduced to −15° C. such that the carbonated composite solidifies. After removal from the reactor, the clathrate-ice composite formed was ground in a mill at −20° C. to a particle size of from 50 to 200 mm. These particles were then admixed with the ice flakes and both ground together into approximately spherical particles having a diameter of from 2–3 mm at −20° C.

The product was spoonable direct from the freezer, even after 6 months frozen storage.

Example 3

An ice mix containing:

|  | % by weight |
|---|---|
| Sugar | 21 |
| Dextrose | 6.5 |
| Locust Bean Gum | 0.2 |
| Gelatin | 0.25 |
| Colouring agent | 1.0 |
| Flavouring | 3.4 |
| Water | to 100 | was formed into a slush product as described in Example 1.

75% by weight of this slush product was admixed with 25% ice granules at −20° C. as in Example 1. The product was packaged and stored frozen as in Example 1.

A spoonable product direct from the freezer, even after 6 months frozen storage, was produced.

Example 4

Example 3 was repeated except 75% by weight slush product was admixed with 20% ice granules at −20° C. and 5% $CO_2$-water clathrate-containing particles as in Example 2.

A spoonable product direct from the freezer, even after 6 months frozen storage, was produced.

I claim:

1. A process for the manufacture of a frozen, spoonable water-ice comprising the steps of:
   (i) producing ice flakes at a temperature of −10° C. or below;
   (ii) grinding the ice flakes produced in step (i) into approximately spherical ice granules at a temperature of −10° C. or below;
   (iii) mixing the ice granules produced in step (ii) with a flavoured ice slurry; and
   (iv) packaging the mixture obtained in step (iii) and freezing the packaged mixture for storage.

2. A process according to claim 1 wherein the ice granules prepared in step (ii) have a diameter of from 1 to 7 mm.

3. A process according to claim 1 wherein the ice granules prepared in step (ii) have a diameter of from 2 to 4 mm.

4. A process according to claim 1 wherein $CO_2$-water clathrate-containing particles at −10° C. or below are admixed with the ice flakes prior to the grinding step (ii).

5. A process according to claim 1 wherein the frozen spoonable water ice comprises from 85 to 50% by weight flavoured ice slurry, from 15 to 50% by weight ice granules and from 0 to 20% by weight $CO_2$-water clathrate containing particles.

6. A process according to claim 1 wherein the frozen spoonable water ice comprises from 85 to 50% by weight flavoured ice slurry, from 25 to 30% by weight ice granules and approximately 5% by weight $CO_2$-water clathrate containing particles.

* * * * *